Aug. 26, 1958  R. W. JENSEN  2,848,868
TEMPERATURE RESPONSIVE FUEL CONTROL APPARATUS FOR GAS TURBINE
Filed Sept. 4, 1953
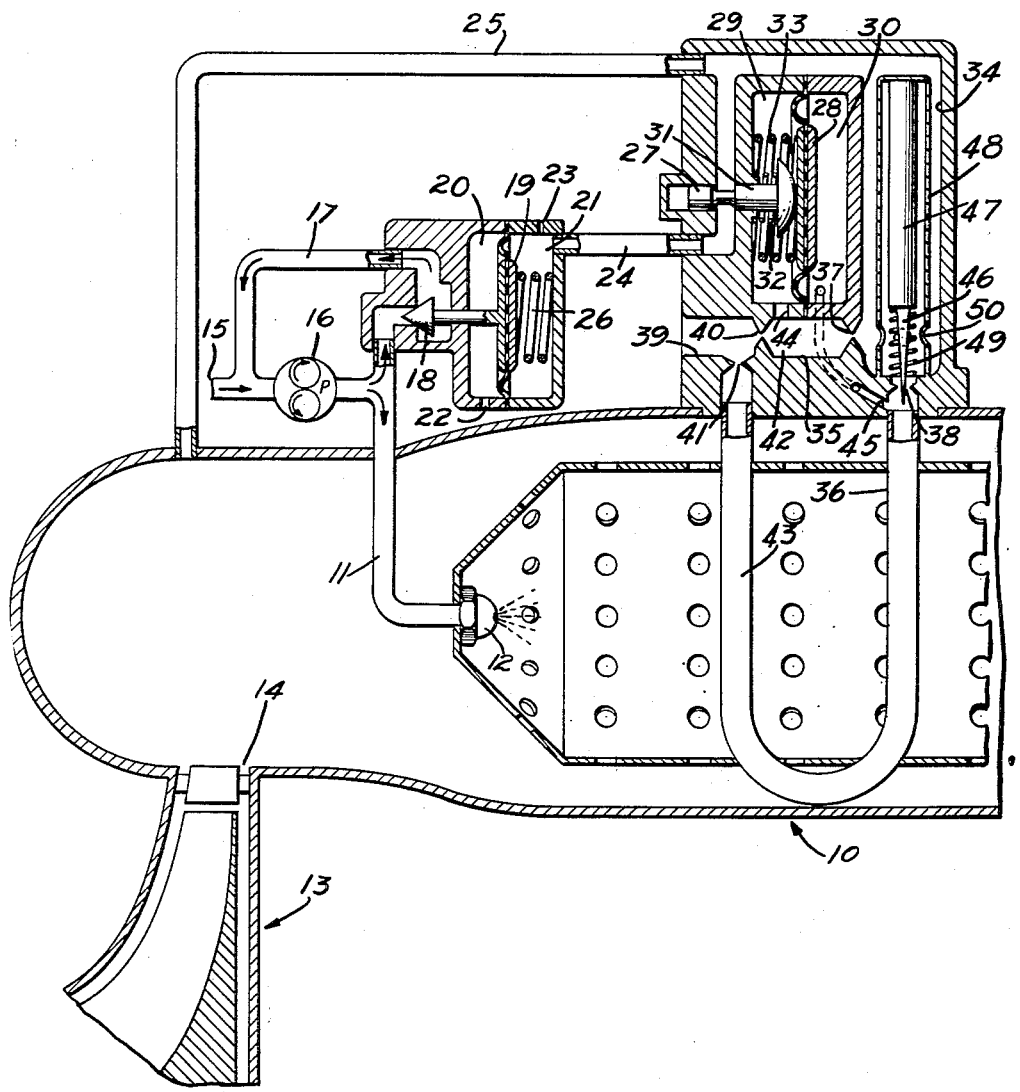
Raymond W. Jensen
Inventor.
BY
Attorney

United States Patent Office 2,848,868
Patented Aug. 26, 1958

2,848,868

TEMPERATURE RESPONSIVE FUEL CONTROL APPARATUS FOR GAS TURBINE

Raymond W. Jensen, Encino, Calif., assignor to The Garrett Corporation, Los Angeles, Calif., a corporation of California Application September 4, 1953, Serial No. 378,635

3 Claims. (Cl. 60—39.28)

The present invention relates generally to control apparatus and is more particularly concerned with temperature control, and as exemplary of one use is considered herein as being applied to at gas turbine for controlling combustion chamber temperature.

Heretofore, conventional thermal responsive control devices placed in the combustion chamber of a gas turbine have in the main been unsatisfactory and impractical due to their inability to successfully withstand the high temperatures for any practical period of time without burning out. In the present invention it is proposed to provide an arrangement wherein a conventional thermostatic control device may be utilized by placing it in a position which is relatively cool as compared to that of the combustion chamber, and associating the control device with means in the combustion chamber which will withstand the high operating temperatures and with which it cooperates to give the desired temperature responsive control.

One object of the invention is to provide a device of simple, dependable construction which may be utilized for controlling relatively high temperatures.

A further object is to provide apparatus for controlling the combustion chamber temperature of a gas turbine, and which will vary the fuel feed to compensate for variations in temperature of combustion air supplied to the combustion chamber.

Another object is to provide control apparatus for regulating the fuel feed to the combustion chamber of an engine in accordance with changes in temperature of the hot gases in the combustion chamber.

Still another object is to provide a temperature regulator for a combustion engine, such as a hot gas turbine, in which combustion air is supplied from a compressor, the regulator utilizing differential air pressure across the compressor as an actuating medium, and air from the compressor as a temperature sensing medium.

With the foregoing in mind, the present invention briefly comprises in its broad concept means which may be adjusted to regulate the flow of fuel to the combustion chamber of a hot gas engine, such as a hot gas turbine. The fuel control means includes a movable wall structure such as a diaphragm or its equivalent. Suitable means are provided so that the movement of this wall will vary the fuel feed. The movable wall is subjected to pressures on its opposite sides, one of these pressures being variable in response to changes of temperature in the combustion chamber of the engine.

In order to obtain the pressure applied to the movable wall, a pair of parallel fluid flow paths are connected across the inlet and discharge of the compressor which furnishes combustion air to the combustion chamber. These two flow paths are provided with restricted inlets and outlets, and one of the flow paths is formed by a tube of material adapted for high temperature operation, which is positioned in heat exchange relation with the hot gases of the combustion chamber. This path also has a metering valve at its restricted inlet, this valve being temperature responsive to the fluid approaching the inlet of this path. The spaces between the inlet and outlet of each path are connected to opposite sides of the movable wall and since one of these spaces is temperature responsive, the pressures acting on the movable wall will be varied in proper direction to change the fuel supply and make the proper correction to restore the operation to normal temperature, when temperature variations occur.

Further objects of the invention will be brought out in the following part of the specification, wherein detailed description is for the purpose of fully disclosing several embodiments of the invention without placing limitations thereon.

Referring to the accompanying drawings, which are for illustrative purposes only, the single view illustrates more or less diagrammatically temperature control apparatus embodying the features of the herein described invention, the invention being applied to the combustion chamber of a hot gas turbine.

Referring more specifically to the drawings, a hot gas combustion chamber is generally indicated by the numeral 10. This combustion chamber may embody various constructions, and in accordance with conventional practice is utilized for the mixing of a suitble fuel adapted to be furnished through a supply line 11 and ejected through a fuel nozzle 12 into the combustion chamber where it is mixed with air to form a combustible mixture. In accordance with usual practice, the air is supplied under pressure to the combustion chamber from a suitable compressor 13 which is usually driven by the turbine and adapted to have its air inlet from ambient atmosphere, and its discharge as indicated at 14 connected with the combustion chamber of the gas turbine.

As shown in the illustrated embodiment, fuel is supplied from a suitable source 15 to a fuel pump 16, this pump having its high-pressure sides connected with the line 11 and a bypass 17 which is under control of a bypass valve 18 by the regulation of which the amount of fuel supplied to the nozzle 12 may be controlled.

In the present instance, the valve 18 is shown as being connected with a movable wall 19 in the form of a diaphragm which extends between and separate chambers 20 and 21. The chamber 20 is vented through an opening 22 to atmosphere, while the chamber 21 is vented to atmosphere through a restricted orifice 23 and connected through a conduit 24 with a source of fluid pressure. In the present instance, this fluid pressure is shown as being obtained by connecting the conduit 24 with a bleed connection 25 by which air under pressure is obtained from the compressor discharge. Other fluid pressure sources might, of course, be utilized for actuation of the movable wall 19. An expansion spring 26 is positioned also in the chamber 21, this spring being calibrated for the particular installation characteristics which are to be met. The spring 26 acts in a direction to move the valve 18 towards a seated or closed position.

Operation of the valve 18 is controlled by means of a pilot valve 27 mounted in the conduit 24 and being operable to control the flow therethrough, and consequently the fluid pressure existing in chamber 21. Controlling movements of the valve 27 are effected by means of a movable wall 28 in the form of a diaphragm which extends between and separates chamber 29 and 30. The chamber 29 has a stem portion 31 of the valve 27 therein, this stem being retained in abutting position against the adjacent side of the movable wall 28 by means of an expansion spring 32. This chamber also houses an expansion spring 33 which is likewise calibrated depending upon the installation characteristics of a particular installation, and acts on the movable wall 28.

The position of the movable wall 28 is determined by differences in pressure existing on opposite sides of the movable wall. The source of these pressures and the manner in which they are varied constitute a primary feature of the present invention, and will now be explained specifically.

The means for actuating the pilot valve 27 are contained in a housing of suitable construction which is so arranged as to provide an entrance chamber 34 which is connected with bleed conduit 25 and adapted to receive fluid under pressure from the discharge of the compressor 13.

The chamber 34 communicates, in this instance, with a pair of parallel flow paths 35 and 36 respectively through restricted inlet passages 37 and 38. These flow paths connect to a common outlet 39 and ambient atmosphere through restricted outlet passages 40 and 41, the outlet passages in each case being in spaced relation to the inlet passages of the flow paths so as to define intermediate pressure chambers 42 and 43 respecively. The chamber 42 has a duct connection 44 with chamber 29, while pressure chamber 43 is connected with chamber 30 by a duct 45. It will be observed that the pressure chamber 42 is positioned exteriorly of the combustion chamber, while the pressure chamber 43 is formed by a tube of suitable ceramic or other material capable of withstanding high temperature positioned within the combustion chamber in heat exchange relation with respect to the hot combustion gases therein.

It will be noted also that further provision is made for varying the flow through the inlet passage 38 of the flow path 36 to compensate for variations in the temperature of air bled from the compressor discharge. More specifically the flow through inlet passage 38 is varied by means of a needle valve 46 which is contoured to give the desired corrective effect. This needle valve is carried by an elongate member 47 contained within a tubular housing 48, the end of member 47 opposite the end which carries the needle valve being retained against the bottom of the housing 48 by means of an expansion spring 49. Suitable openings 50 are provided in the housing to permit flow from chamber 34 into the inlet passage 38. The tubular housing 48 is constructed of a material which is adapted to expand upon being subjected to increasing temperature. Thus, as the temperature of the air approaching the inlet passage 38 increases, the needle valve is raised to permit greater flow, and when the temperature of air decreases the flow through inlet passage 38 is decreased.

The operation of the parallel flow paths will now be considered. Since the inlet and outlet temperatures of the air flowing through flow path 35 are substantially the same, the pressure drop at the restricted inlet passage and outlet passage will be substantially the same and an intermediate pressure will obtain in the pressure chamber 42 which will remain substantially constant during temperature changes of the air discharged from the compressor.

A somewhat different condition prevails in the flow path 36 due to the heating of the air during its passage through the pressure chamber 43. It will be appreciated that the temperature of the air flowing into inlet passage 38 will be the same as that entering inlet passage 37. However, due to the heating effect of the air in pressure chamber 43, heated air will be passed through the outlet passage 41 instead of air having the same temperature as that entering the pressure chamber 43. Under said circumstances, the outlet passage 41 will constitute a greater flow restriction with the result that a higher pressure will obtain in pressure chamber 43. The pressures, which act on opposite sides of the movable wall 28 are brought into balanced action on the movable wall by means of the calibrated spring 33, to provide a balanced condition for the normal operating temperature of the combustion chamber of the turbine.

Temperature variations from the normal operating temperature may occur without a change in temperature of the discharged air from the compressor, such as might be due to loading or other causes, or may occur due to an increase in the temperature of discharge air from the compressor for some reason.

Under the first condition, namely, where the temperature of discharge air remains unchanged, the increased temperature in the combustion chamber will cause a rise in the pressure within the pressure chamber 43 due to increased resistance to the discharge through the outlet passage 41. Thus, the increased pressure in pressure chamber 43 will be reflected in chamber 30 and tend to move the valve 27 to the left to cause a restriction in the flow through conduit 24 and a consequent decrease of pressure in chamber 21. As a result, the higher pressure of the fuel acting on the face of valve 18 will force it into a more open position and permit a greater bypassing of fuel back to the pump inlet. This will decrease the fuel flow to the nozzle 12 and result in a decrease in temperature in the combustion chamber. Likewise, an opposite effect will be obtained for a decrease in temperature within the combustion chamber, which will result in decreasing the amount of fuel bypass so that more fuel is supplied to the combustion chamber to increase its temperature back to the normal operating condition.

In the event that the temperature increase is caused by an increase in temperature of the air bled from the compressor discharge, the temperature at the inlet passage 38 will be increased substantially the same as the temperature of outlet air at the outlet passage 41 so that this alone does not change the pressure in the pressure chamber 43. However there is an additional effect which must be considered. It will be observed that, if the inlet passage 38 were of constant size, the increased temperature of the approaching air would cause greater resistance to its passage through the inlet passage 38 so that there would be a tendency to decrease the pressure within the pressure chamber 43 and movement of the wall 28 towards the right with the result that greater pressure would be applied in the chamber 21 to the wall 19 in a direction tending to close the valve 18. In order to compensate the flow through the inlet passage 38 just sufficiently to establish a new balanced condition in which the fluid supply is decreased an amount just enough to compensate for the increase in temperature due to the increased temperature of the discharge air, the needle valve 46 is properly contoured to bring about such operation. In other words with an increase in the compressor discharge air temperature, the tubular housing 48 will expand sufficiently to permit raising of the needle valve 46 and an increase of flow with lessened resistance through the inlet passage 38 of such value as to provide a pressure within the pressure chamber 43 which is consistent with normal temperature operation under the condition of increased temperature of the compressor discharge. By the same token, if the discharge temperature of the compressed air is decreased, an opposite action will be obtained and a reduced flow of fuel to the nozzle 12 provided to bring the operating temperature back to normal.

Various modifications may suggest themselves to those skilled in the art without departing from the spirit of my invention, and, hence, I do not wish to be restricted to the specific form shown or uses mentioned, except to the extent indicated in the appended claims.

I claim:

1. Control mechanism for a gas turbine having a combustion chamber operatively connected with a fuel supply flow path and a source of combustion air under pressure, comprising: a fuel control valve; a fluid pressure responsive actuator for said valve; means for controlling said fluid pressure including a movable wall; a pair of parallel fluid flow paths respectively connected through restricted inlets with said combustion air, and having restricted outlets, one of said parallel flow paths being in heat exchange relation with said combustion chamber; flow connections respectively connecting the opposite sides of said movable wall with said parallel flow paths; and a temperature responsive needle valve for varying the flow through the restricted inlet of said one of said parallel flow paths in response to temperature changes of said combustion air.

2. The combination with a gas turbine combustion chamber connected to receive combustion air from a compressor driven by the turbine, of means for supplying a combustible fuel to said combustion chamber; a pair of parallel fluid flow paths respectively connected through restricted orifice inlets with said combustion air, and having restricted orifice outlets, one of said flow paths being poistioned exteriorly of said combustion chamber, and the other of said flow paths having a substantial portion positioned within the combustion chamber; means for varying the amount of fuel supplied to said combustion chamber in response to variations in the pressure differential existing in portions of the flow paths between their inlets and outlets; and a metering valve controlling the inlet orifice of said other of said flow paths, said valve being responsive to temperature variations of the combustion air flowing to said metering valve.

3. In combination: a gas turbine combustion chamber circumscribed by a wall structure, said chamber being connected to receive combustion air from the discharge of a compressor driven by the turbine, and combustible fuel from a fuel source; a housing mounted on said wall structure having an inlet connected to supply air from said compressor discharge, and an outlet in communication with atmosphere; a pair of fluid flow paths respectively having a restricted inlet orifice in said housing in communication with said housing inlet and a restricted outlet orifice in said housing in communication with said housing outlet, one of said paths including a pressure chamber positioned in said housing between the inlet orifice and outlet orifice of said path; a tubular member connected between the inlet orifice and outlet orifice to form a pressure chamber in the other of said paths, said tubular member having a substantial portion of its length positioned within the combustion chamber wall structure and being subject to combustion temperatures; a valve for controlling the flow of combustible fuel to said combustion chamber; means for actuating said valve in response to pressure differential between the pressures in said pressure chambers; and a temperature responsive metering valve in said housing for controlling the restricted orifice inlet in said other of said paths.

References Cited in the file of this patent

UNITED STATES PATENTS

| | | |
|---|---|---|
| 826,980 | Wilkinson | July 24, 1906 |
| 1,455,633 | Lundgaard | May 15, 1923 |
| 1,934,982 | Jones | Nov. 14, 1933 |
| 2,129,586 | Moller | Sept. 6, 1938 |
| 2,272,815 | Otto | Feb. 10, 1942 |
| 2,361,206 | Hoppe | Oct. 24, 1944 |
| 2,476,030 | Everington | July 12, 1949 |
| 2,549,625 | Moore | Apr. 17, 1951 |
| 2,606,420 | Moore | Aug. 12, 1952 |
| 2,635,460 | Moore | Apr. 21, 1953 |
| 2,635,581 | Karig | Apr. 21, 1953 |

FOREIGN PATENTS

| | | |
|---|---|---|
| 90,639 | Sweden | Oct. 26, 1937 |